M. J. GREEN.
PORTABLE GAS COOKING DEVICE.
APPLICATION FILED JULY 6, 1914.

1,149,257.

Patented Aug. 10, 1915.

2 SHEETS—SHEET 1.

Witnesses:
W. L. Dow.
John F. McCanna.

Inventor:
Michael J. Green
By Pond & Wilson
Attys.

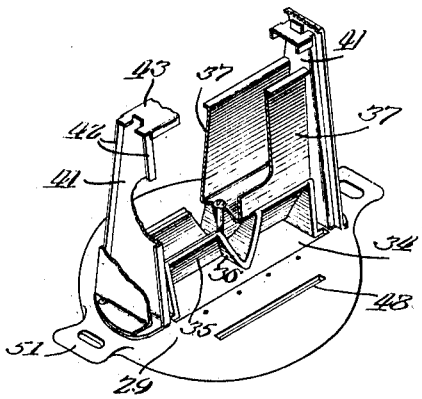

UNITED STATES PATENT OFFICE.

MICHAEL J. GREEN, OF ROCKFORD, ILLINOIS, ASSIGNOR TO ECLIPSE GAS STOVE COMPANY, OF ROCKFORD, ILLINOIS, A CORPORATION OF ILLINOIS.

PORTABLE GAS COOKING DEVICE.

1,149,257.  Specification of Letters Patent.  Patented Aug. 10, 1915.

Application filed July 6, 1914. Serial No. 849,186.

*To all whom it may concern:*

Be it known that I, MICHAEL J. GREEN, a citizen of the United States, residing at Rockford, in the county of Winnebago and State of Illinois, have invented certain new and useful Improvements in Portable Gas Cooking Devices, of which the following is a specification.

This invention relates in general to cooking devices and has more particular reference to portable devices adapted to be readily transported from place to place and used on a dining table or in any desirable and convenient place.

Cooking devices of this general character employing electricity as the means for generating the desired amount of heat are now on the market. Many houses, however, are not equipped with electricity, and my present invention aims to provide a cooking device in which gas will be employed as the heating medium, thus enabling toast and other articles of food to be prepared at the table and served hot in homes where gas is used instead of electricity.

One of the primary objects, therefore, of my present invention, is to provide a gas cooking device which will be light in weight so as to be readily moved about from place to place and at the same time will be strong and durable, which will be of pleasing and attractive appearance, and which will be economical in the use of gas and efficient in its operation.

Another object is the provision of a device of this character which can be readily taken apart to be cleaned and which will comprise a detachable toaster, stably supported when in operative position, but readily movable so that pots or dishes may be substituted therefor and heated by the burner beneath.

Figure 1:
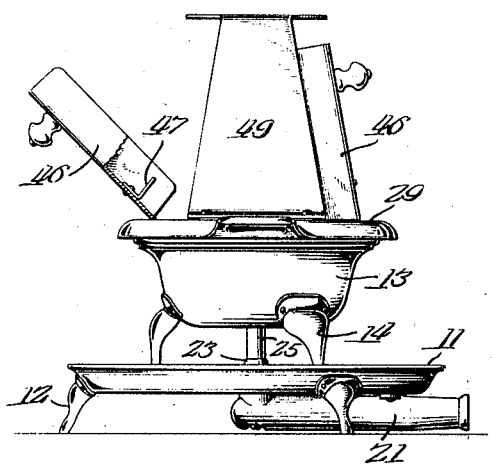
Figure 2:
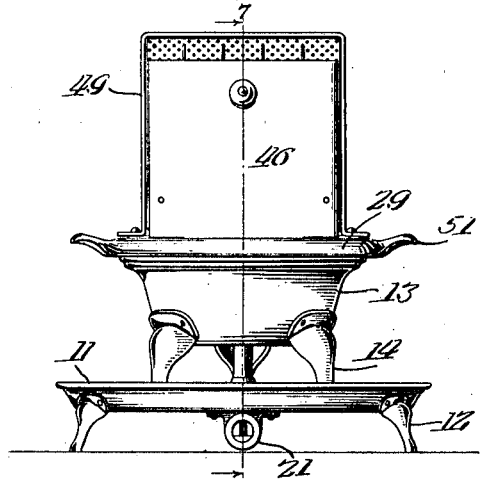
Figure 3:
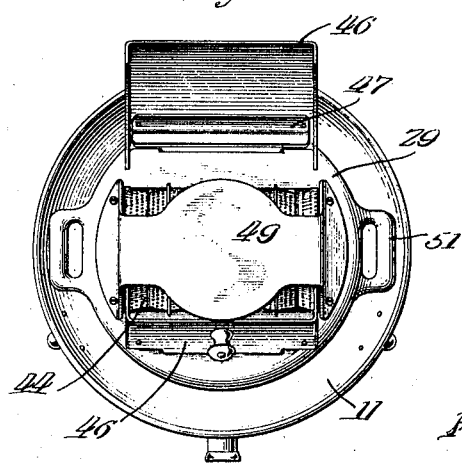
Figure 4:
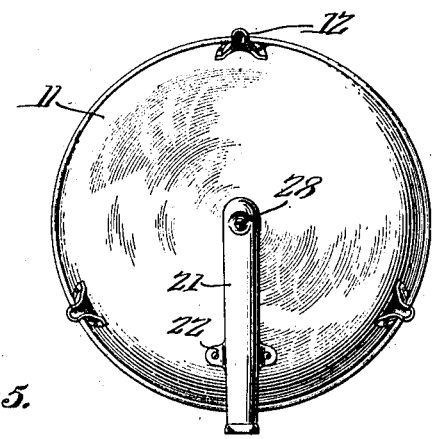
Figure 5:
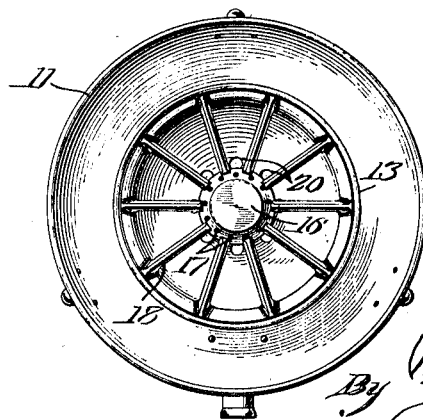

The nature of my invention, its mode of use, and the advantages thereof will be readily understood from a consideration of the accompanying drawings, wherein I have illustrated one practical embodiment of the invention, and wherein:

Figure 1 is a side elevation of a device embodying my invention, one of the bread holders being shown as moved to an inoperative position and a part thereof being shown in section. Fig. 2 is a front elevation, looking at the right-hand side of Fig. 1. Fig. 3 is a plan view of Fig. 1. Fig. 4 is a bottom view thereof. Fig. 5 is a plan view of the cooker with the toaster removed. Fig. 6 is a bottom view of the toaster. Fig. 7 is a vertical sectional view through the cooking device taken on the line 7—7 of Fig. 2. Fig. 8 is a vertical sectional view taken on the line 8—8 of Fig. 7. Fig. 9 is a view in perspective of the toaster portion of the cooker, the bread holders and rests being removed; and Fig. 10 is a fragmentary plan view taken on the line 10—10 of Fig. 8.

The base of the cooking device is in the form of a dished tray designated by the reference character 11, and is supported in a raised position by legs 12.

An open-top bowl 13 having legs 14 fixedly attached thereto, is immovably mounted upon the tray 11. This bowl forms a heating chamber 15 in the lower portion of which is positioned a gas burner 16. The burner is substantially globular in shape and is provided at its upper side with a plurality of gas outlets 17 arranged circumferentially thereabout, for the purpose of directing a flame in an upwardly and outwardly direction. A grate 18 spanning the open top of the bowl is supported by the rim thereof, which is formed with an annular depressed seat 19 to receive the grate. The base of the bowl is formed with a plurality of air inlets 20 arranged circumferentially about the burner, for permitting auxiliary air to be taken into the bowl, thereby increasing the volume of heated air.

The burner is retained in position by means of a pipe connection or conduit which furnishes gas thereto, this connection also serving to hold the bowl fixedly in position on the tray. The conduit comprises a pipe 21 supported beneath and fixedly attached to the tray at 22, its inner end at the center of the tray being closed. A valve casing and mixing chamber 23 located above the tray has a reduced threaded shank 24 which extends through an aperture in the tray and is screw-threaded into a tapped opening adjacent to the inner end of the pipe 21, thereby locking the inner end of said pipe fixedly to the tray. A pipe 25 screw-threaded at its opposite ends into the burner and valve casing respectively, completes the connection between the pipe 21 and the burner. It will be seen that with the valve casing and burner screwed tightly in position, a gas conduit is formed leading from the periphery of the tray to the burner, and that this connection or conduit also serves to fasten the bowl fixedly on the tray. The valve casing or mixing chamber is formed above the tray with a plurality of air inlets 26 which permit the admixture of air with the inflowing gas which enters the chamber through a port 27 in the transverse wall thereof. A stem 28 screw-threaded through the pipe 21 is adjustable to restrict flow of gas through the passage 27, whereby the proper amount of gas may be supplied to the burner.

A bread toaster surmounting the bowl is detachable at will, and is retained when in its operative position from lateral displacement. The toaster, bowl, and burner are particularly designed and arranged to effect an efficient passage of heated air and an even distribution of the same over the bread to be toasted. The toaster base 29, a casting in the shape of an inverted dish, overlies the grate 18, the dished rim of the base overhanging the rim of the bowl. This base is formed with a plurality of pairs of depending studs 31 which embrace opposite sides of the grate bars, positioning the toaster base centrally upon the bowl and retaining the base from lateral displacement. The base is also formed with depending ribs 32 which rest upon the grate and properly position the base relatively thereto, whereby an air inlet 33 is formed circumferentially of the bowl. The central portion of the base is formed with a rectangular opening 34 extending diametrically above the burner. Spanning this opening and extending longitudinally thereof, there is formed on the base a pair of deflecting walls 35 disposed in substantially V-shape to divide and deflect the rising heated air into two outwardly and upwardly defined paths. The dividing walls 35 are intersected centrally by transversely disposed deflecting walls 36 which further assist in distributing the rising air. These walls are designed to materially effect an even distribution of heated air over the two rectangular areas at the outer sides thereof where the bread to be toasted is placed. The separate passages for the rising air are further defined by inner vertically disposed walls 37 formed of a U-shaped sheet-metal blank, the corners of the cross-portion thereof being seated in grooves 38 formed in the top of the walls 35, and the blank being held in position by a screw-bolt 39 passing through the center of the blank and screwed into the dividing wall portion of the toaster base. At each end of the dividing wall is a sheet-metal vertical standard 41 fixedly attached to the base and converging upwardly, the sides of the standards being flanged as at 42. A top piece 43 joins the upper ends of said standards. Located at the outer side of each wall 37 and across the paths of air rising from the opening 34, is a wall 44 of corrugated and perforated construction. The ends of these walls are clamped about the flanged edges of the standards 41 to maintain the walls in position, as clearly shown in Fig. 10. These walls abut the upper ends of the inner walls 37, as shown in Fig. 7, thereby limiting the height of the air passages. A plurality of vertical wires 45 spaced from the outer sides of the walls 44 serve as means for holding bread from actual contact with the perforated walls 44. Pivoted upon the toaster at the outer side of the perforated walls are a pair of bread holders 46, each holder adapted when in an inoperative position to receive a slice of bread, and to be swung into an operative position with the bread held against the wire stops 45. These holders are each formed of a single piece of sheet-metal having the sides thereof turned up, and each is provided with a bottom 47 upon which the bread rests. Each holder has its lower end disposed in an elongated slot 48 in the toaster base so that it is pivotally and detachably supported, the width of the slot determining the range of swinging movement of a holder. An inverted U-shaped casing 49 of ornamental design, fixedly connected to the base, incloses the top and ends of the toaster. The toaster is provided with handles 51, by which means it may be lifted off the bowl or gas cooker.

From an inspection of Fig. 7 it will be observed that there are clearly defined conduits for guiding heated air to the bread for toasting the same, and that the design and arrangement of the several parts which form these passages is such as to enable a maximum volume of heated air to be evenly distributed over the toasting areas. With the burner in operation, the flames are directed toward the opening 34 in the toaster base. The air heated by the burner, the volume of which air is increased by reason of inlets 20, will pass through said opening 34 and be divided into two separate paths and be deflected outwardly and upwardly toward the perforated walls 44, so as to be evenly distributed over the areas of said walls. When each holder 46 is provided with a slice of bread held against stops 45, the heated air will be diffused through the perforations in the walls 44 and will toast the bread. It will be noted that those walls defining the air passages to the points of use and such that come in actual contact with the heated air, constitute a casing or lining inclosed from outer view by the outer casing 49. By this means the outer casing will retain an attractive finish which will not be tarnished by the heat. This construction also permits the toaster to be designed along attractive and ornamental lines.

A flexible gas hose (not shown) may be readily attached to the end of the pipe 21 through which gas will be supplied to the burner from any convenient gas jet. The toaster when in operative position above the burner is stably and securely supported on the grate above the burner. The toaster, however, may be readily lifted off and replaced by a pot or dish when desired, in which articles of food may be cooked over the burner. The grate itself may be lifted out to permit access to the interior of the bowl 15, in order that the same and the burner may be conveniently cleaned when necessary.

It will thus be manifest that I have provided a portable gas-burning cooking device of ornamental and artistic appearance which can be set on the dining table where toast or other articles of food can be quickly and conveniently prepared and served while hot. The device can be readily moved about and attached to any convenient gas jet by means of an ordinary flexible hose, and is particularly adapted for use in apartments, in flat-buildings, and in hospitals where the preparation of food in relatively small quantities is desirable.

While I have shown and described a particular mechanical embodiment of my invention, it is obvious that the invention will not be circumscribed by the details disclosed, except as may be necessitated by the state of the prior art, and that the toaster is capable of adaptation, by proper change in construction, to toast more than two slices of bread, without departing from the spirit of the invention or sacrificing any of the material advantages thereof.

I claim as my invention:

1. As an article of manufacture, a tray, a bowl mounted upon the tray, a grate over the top of the bowl, a burner located within the bowl, a gas conduit attached to and located beneath the tray, a pipe connection between said conduit and the burner for holding the bowl fixedly with the tray and for furnishing gas to the burner.

2. As an article of manufacture, a tray, a bowl mounted upon the tray, a grate over the top of the bowl, a burner located within the bowl, a gas conduit attached to and located beneath the tray, and a pipe connection between the conduit and the burner including an adjustable valve for controlling the flow of gas to the burner.

3. As an article of manufacture, a tray, a burner casing mounted upon but spaced above the tray, a burner arranged within the casing, a grate overlying the burner, a gas conduit located beneath the tray, and a gas conduit connecting the burner with the first-named conduit and constructed so as to hold the burner casing fixedly with the tray.

4. A portable gas cooker, comprising a tray, a bowl supported on said tray, a burner disposed in said bowl, means for fastening said tray, bowl and burner rigidly together, and a toaster comprising a bottom shaped to fit over said bowl and provided with a centrally disposed opening, bread holders pivotally connected to said bottom, and heat directing and radiating means positioned over said opening.

5. A portable gas cooker, comprising a tray, a burner carried by said tray, a support rigidly connected to the tray and surrounding said burner, and a toasting device shaped to fit over said support, said device comprising a solid bottom provided with a central opening, heat deflecting means disposed over said opening, and bread holding devices pivotally and detachably mounted on said base at each side of said deflecting means.

6. A portable gas cooker, comprising a tray, a centrally disposed burner carried thereby, a casing surrounding said burner, said casing, burner and tray being rigidly connected together, a grate removably supported on said casing over the burner, and a toasting device removably supported above said grate.

7. A portable gas cooker comprising a tray, a burner carried thereby, a casing surrounding said burner, said casing, tray and burner being rigidly connected together, and a toasting device removably supported upon said casing above the burner in position to receive the heat from the burner.

8. As an article of manufacture, a burner casing provided with a centrally disposed gas burner, a grate overlying the burner adapted to receive cooking utensils, a toasting device having a base with a downwardly directed peripheral flange adapted to fit over said grate, supporting ribs terminating within said flange, said base being provided with a central opening, a pair of holders located above said open center, and heat flues for guiding heated air from said central opening to the holders.

9. A toaster having a base provided with a downwardly directed peripheral flange, supporting ribs terminating within said flange, a burner below said base, means above said base for supporting the material to be toasted, and means formed on said base to deflect heated air against said supporting means.

10. A toaster having a base member provided with a downwardly directed peripheral flange, supporting ribs terminating within said flange, said base being solid except for a central opening, a burner below said opening, supporting means on said base at the opposite sides of said opening, and means centrally located in said opening for deflecting heated air against said supporting means.

11. A toasting device having a base member provided with a central opening, a burner below said opening, supporting means located on the opposite sides of said opening, means located centrally in said opening for deflecting heated air against said supporting means, and an inner member mounted above said deflecting means for forming a plurality of independent heat flues.

12. A toasting device having a base member provided with a central opening, a top piece, a burner below said opening, standards at each end of said opening for supporting said top piece, holding means at each side of said opening, and heat flues for guiding heated air from said central opening to said holding means, the ends of the heat flues being formed by said standards.

13. A toaster having a base member provided with a downwardly directed peripheral flange, supporting ribs terminating within said flange, said base being solid except for a central opening, a burner below said opening, supporting means on said base at the opposite sides of said opening, and means centrally located in said opening for deflecting heated air against said supporting means, said means comprising a cross-shaped member having inclined deflecting surfaces disposed at substantially right angles to each other.

MICHAEL J. GREEN.

Witnesses:
MABON P. ROPER,
W. H. GAFFNEY.